…

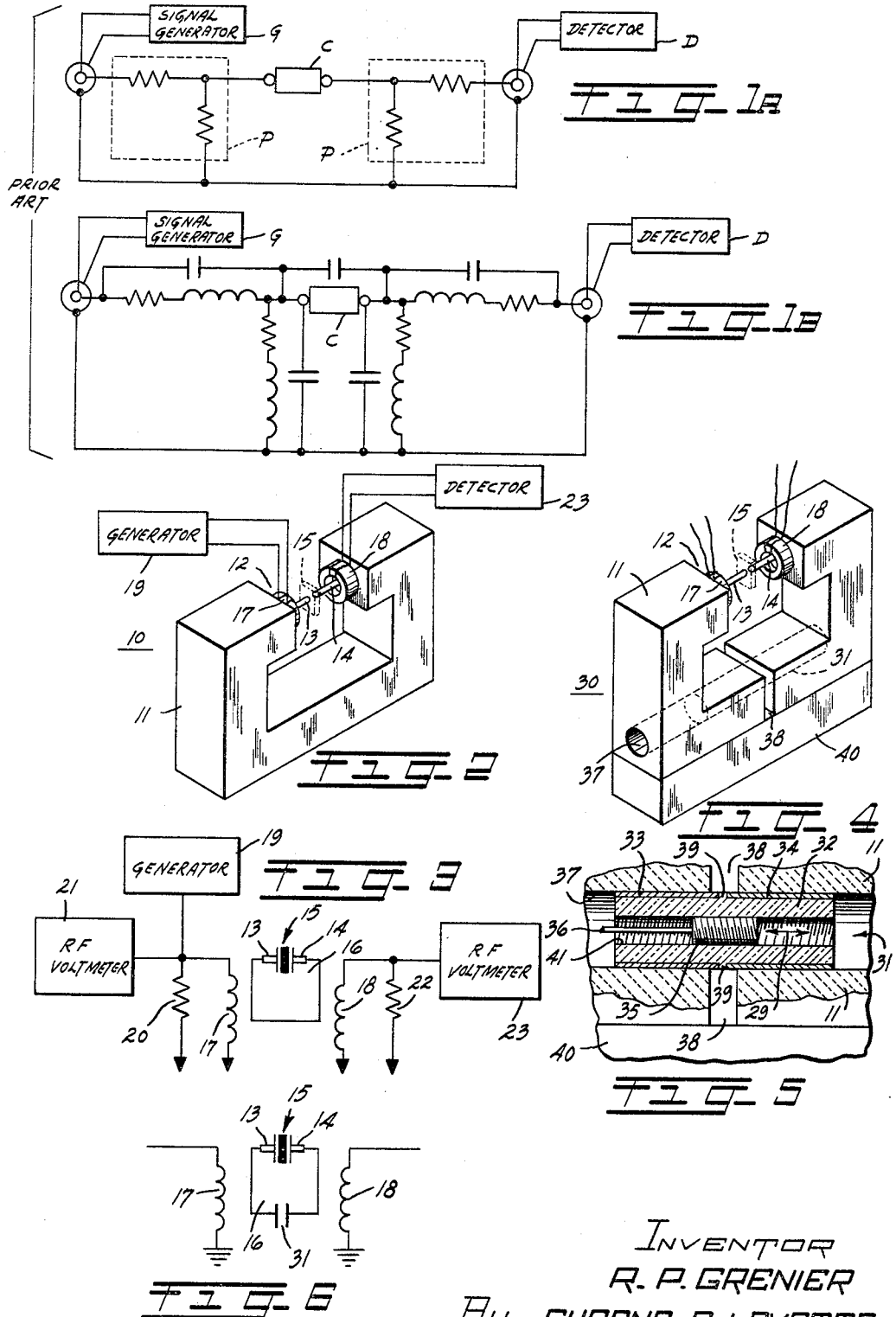

United States Patent Office 3,490,036
Patented Jan. 13, 1970

3,490,036
METHOD FOR TESTING A CRYSTAL WHEREIN THE CRYSTAL IS CONNECTED IN SERIES WITH A CONDUCTIVE CORE TO FORM A SINGLE CURRENT CONDUCTING LOOP
Robert P. Grenier, Newburyport, Mass., assignor to Western Electric Company, Incorporated, New York, N.Y., a corporation of New York
Filed Jan. 15, 1968, Ser. No. 697,861
Int. Cl. G01r 29/22, 27/26, 11/52
U.S. Cl. 324—56                                                    1 Claim

ABSTRACT OF THE DISCLOSURE

The disclosure concerns a method and means for measuring and ascertaining the electrical characteristics of a crystal, such as its resonant frequency, its effective resistance and inductance. A single turn current conducting loop is formed with the crystal under test electrically in series in the loop. The loop is a substantially toroidal conductive core having a gap for mounting the crystal under test. A pair of ferrite current transformer windings are coupled to the loop wherein the loop serves as a single turn secondary winding with respect to the input transformer winding. The loop also serves as a single turn primary winding with respect to the output transformer winding. The crystal is energized for test purposes by a signal source applied to the input winding. Output responses are detected at the output transformer winding.

BACKGROUND OF THE INVENTION

Field of the invention

This invention relates to methods and means for measuring electrical parameters of series resonant components and in particular, the electrical characteristics of piezoelectric crystals, such as natural or synthetic quartz, by forming a single turn conductive loop made up of a conductive core which includes the crystal under test electrically in series in the loop. A pair of current transformer windings are coupled to the loop, whereby the loop is energized by a test signal of given frequency applied to one transformer winding. Output responses from the components under test are detected at the other transformer winding.

The frequency of oscillation of transmitting devices may be controlled by using piezoelectric crystals such as natural or synthetic quartz. The electrical parameters of the crystal, such as its resonant frequency, positive reactance frequency, effective resistance and inductance are measured during the stages of component fabrication, and in particular at its final stage. Lump circuit networks are normally employed for measuring the aforesaid electrical parameters of the crystal unit. For purpose of fabrication economy, and to avoid complex test network apparatus, it is desirable that the test network have a broad frequency range of operation. This permits a single test network to measure crystal units having different oscillating frequencies over a wide range of frequencies, otherwise the number of test networks would have to be unduly multiplied to test crystal units for many individual operating frequencies.

Description of prior art

Reference is made to FIG. 1A for a typical prior art measuring network. FIG. 1B depicts its uncompensated equivalent circuit. The test fixture employs resistance pads P forming a π network with the crystal C under test mounted in the central horizontal arm. An adjustable frequency generator G energizes the network at its input side. Suitable detector means D at the output of the network measures the crystal responses for ascertaining its characteristics. The equivalent circuit of the network as depicted in FIG. 1B illustrates that the network is encumbered by parasitic inductance and capacitance reactive components. These parasitic components create harmful frequency sensitive effects which hamper the accuracy of the crystal measurements and the network operation. Normally, the network requires added compensating reactance components, not shown herein, to cancel out effects of the parasitic reactances. In particular, the values of the added components are dependent upon the particular frequency at which the network is being used for measuring a crystal unit. This, therefore, necessitates various compensating reactive components for measurements at different operating frequencies. Furthermore, satisfactory reactive compensation becomes more difficult and nearly impossible upon increasing the measuring frequencies to the higher values.

SUMMARY OF THE INVENTION

The instant invention overcomes the prior art problems of frequency sensitive reactances which harmfully affect the measurement of crystal parameters by using a novel transmission measuring network. A single turn conducting loop is formed with the crystal under test electrically in series in the loop. The loop consists of a toroidal conductive core having a gap for mounting the crystal under test. Input and output current transformer windings havings having ferrite cores are coupled to the loop. The loop serves as a single turn secondary winding with respect to the input transformer winding. The loop also serves as a single turn primary winding with respect to the output transformer winding. A signal source is applied to the input winding for energizing the crystal at a desired frequency. Output responses are detected at the output transformer winding.

The single loop test fixture in combination with current transformers, as contemplated herein, reduces the impedance looking into the series resonance loop to a fraction of an ohm, and reduces parasitic reactive components to a bare minimum, whereby the frequency sensitivity of the test device and the accuracy of measurements made thereby are considerably improved. The resistive component of the single turn fixture is for all practical purposes zero. Consequently, the Q of the circuit is almost entirely dependent upon the crystal unit under test. This relative increase in Q, in comparison to tests employing prior art fixtures, allows frequency measurements to be made with greater resolution, and provides measurements of considerably improved accuracy and precision.

Accordingly, it is the principal object of the invention to provide economical method and means for securing precision measurements of the electrical properties of a series resonance circuit or an element thereof, such as a piezoelectric crystal.

In particular, it is an object of the invention to secure precision measurements of the electrical properties of a natural or synthetic quartz crystal during the fabrication of same.

It is a further object of the invention to provide a method and means for forming a transformer network for measuring the electrical properties of a piezoelectric crystal. The transformer network includes a conductive toroidal core. The crystal under test is mounted in the core to form a single turn conducting loop. Input and output current transformers are coupled to the loop. The loop is energized by suitable test signals connected to the input winding, and crystal responses are detected at the output winding.

As a further object, the transformer network, as contemplated herein, permits the inclusion of an adjustable capacitor in the toroidal core to permit a resonant frequency test of crystal properties in series resonance with a capacitor element.

Further objects and advantages will become apparent from the following description of the invention taken in conjunction with the figures in which:

BRIEF DESCRIPTION OF THE DRAWINGS

FIG. 1A illustrates schematically a prior art test fixture for ascertaining the electrical properties of a crystal; and FIG. 1B illustrates its equivalent circuit;

FIG. 2 is an isometric view depicting a test fixture in accordance with the principles of the invention herein;

FIG. 3 shows schematically the test circuit of FIG. 2;

FIG. 4 is an isometric view illustrating an alternative embodiment of the invention;

FIG. 5 is a fragmentary view partly in section illustrating a capacitor unit incorporated in the FIG. 4 embodiment; and FIG. 6 is a fragmentary schematic illustration of the electrical circuit employing the capacitor unit depicted in FIGS. 4 and 5.

DETAILED DESCRIPTION

Reference is made to FIGS. 2 and 3 for a crystal test fixture 10 in accordance with the invention claimed herein. Fixture 10 includes a brass toroidal core 11 provided with a crystal mounting gap 12 and individual test terminals 13, 14 extending from opposite ends of core 11 and into the gap 12. Terminals 13, 14 are designed to mount the crystal 15 under test therebetween, whereby the mounted crystal 15 and the core 11 form a single turn current conducting loop 16, see the schematic FIG. 3, with the mounted crystal 15 electrically in series in the loop 16.

Input and output current transformer windings 17, 18 are coupled to the loop 16 on opposite sides of the gap 12. In particular, the individual windings 17, 18 are mounted over respective test terminals 13, 14. Loop 16 serves as a single turn secondary winding with respect to the input windings 17, and serves as a single turn primary winding with respect to the output winding 18.

Commercially available current transformer windings such as a Tektronix CT-2 unit having a ferrite core may be employed as the transformer windings 17, 18 for coupling to the conductive loop 16. By employing current transformer windings, the resistance looking into the crystal 15 is in the order of a fraction of an ohm, and thus reduces the effects of capacitive parasitic reactive components to a bare minimum. The single turn conducting loop reduces inductive reactive components to a bore minimum, and consequently improves the accuracy of the frequency characteristics of the measuring circuit.

The loop 16 is energized by a frequency adjustable signal source generator 19 connected to the input winding 17. A resistance termination 20 of suitable value, for example 50 ohms, is connected across the input winding 17 to the common ground to match the impedance looking into generator 19.

Termination 20 also serves as a stabilizing shunt across the input of the measuring loop 16 to hold the impedance looking into the loop constant in spite of frequency changes made by the energizing signal applied to the loop. An RF voltmeter 21 is connected across the input, see FIG. 3, for detecting the voltage applied to the loop 16, and for all practical purposes, the voltage across the crystal 15. Meter 21 may be calibrated to account for the transformer ratio factor whereby the crystal voltage may be read directly from meter 21.

A resistive termination 22 of prescribed value, for example 50 ohms, is connected across output winding 18 for impedance matching purposes, and also for maintaining the output impedance relatively constant regardless of changes made to the frequency of the signal source which is energizing crystal 15 for test purposes. The output voltage across the winding 18 is detected by an RF voltmeter 23 connected to the common junctions of winding 18 and termination impedance 22.

Because the resistive component of the single turn fixture is zero for all practical purposes, the Q of the test fixture circuit is almost entirely dependent upon the crystal 15 under test. The value of crystal current is a function of the output transformer turns ratio and the ratio of the detected output voltage and the known and fixed value of termination 22. A signal voltage applied to the primary 17 of the input transformer induces a voltage across the crystal 15. The loop 16 acts as a single turn secondary winding of the input transformer. Current flow through the crystal 15 causes an induced voltage in the secondary 18 of the output transformer, wherein the loop 16 serves as a single turn primary for the output transformer. The maximum current occurs when the frequency of the test signal is the same as the series resonance frequency of the single turn loop 16 made up of the combined turn core 11 and crystal 15.

The following is a description of a method for making crystal measurements employing the disclosed test circuit. In order to determine resonant frequency of the crystal, the frequency generator 19 is adjusted to obtain a signal voltage peak on the output voltmeter 23. The level of the signal generator 19 is adjusted to obtain a desired crystal current, for example without overloading the crystal 15, and is indicated by voltmeter 23. The foregoing steps are repeated in the stated sequence until further adjustments are no longer required. The resonant frequency of the crystal 15 then may be read from the frequency setting of generator 19.

The effective resistance of the crystal 15 may be determined by the crystal voltage divided by the crystal current. The value of the crystal voltage may be taken directly from the calibrated input voltmeter 21 to ascertain the value of the voltage applied to the crystal 15 through the transformer action. The crystal current may be ascertained as a function of the detected output voltage divided by the value of termination 22. Output meter 23 may be calibrated to provide the crystal current as a direct reading.

The crystal inductance can be ascertained by determining the half power point frequencies. Without changing the signal level of generator 19 from its prior setting at which time crystal resonance was ascertained, the frequency of the generator 19 is increased above resonance to obtain an output reading at meter 23 which is 3 db lower than the output voltage reading corresponding to crystal resonance. This half power point frequency may be read from the frequency setting of generator 19. The generator frequency (again without changing its signal level) is then decreased through resonance and to a frequency less than resonance until the input signal again produces a voltmeter response at meter 23 which is 3 db lower than the output voltage reading corresponding to crystal resonance. This lower value of frequency is noted from the setting of generator 19. Crystal inductance, L, is determined from the well known relationship of:

$$L = R/2\pi \Delta f$$

where R is crystal resistance, and $\Delta f$ is the frequency bandwidth equal to the difference between the two noted half power point frequencies.

Crystals are often employed in series with capacitors in oscillator units. Accordingly, it may be desirable to carry out the foregoing crystal measurements, but with a series capacitance having a value equal to a series oscillator capacitance. A fixture 30 is depicted in FIGS. 4 and 5 and schematically in FIG. 6 for such purpose. Except for a capacitor unit 31, the test fixture apparatus 30 is similar to the previously described test fixture 10; hence, corresponding elements of both fixtures are indentified by like reference numbers.

The fixture core 11 incorporates an adjustable capacitor unit 31 which is electrically in series in the core loop 16. Capacitor 31 is actually two series connected capacitors formed by a hollow tubular member 32 of dielectric material such as glass or quartz. The outer surface of member 32 has two electrically spaced apart coatings 33 and 34 of conductive material, for example, silver or other highly conductive coatings. A conductive plug 35 is mounted in the inner bore of the tubular member 32. Plug 35 is adjustable by conventional means depicted as rod 36 for travel axially along the inner bore of member 32 in order to vary the capacitance value of unit 31. When the plug 35 is at its centralized position with respect to the metallic surfaces 33, 34 as shown in FIG. 5, the capacitor unit 31 introduces its maximum value of capacitance into the series loop 16. The capacitance value of unit 31 may be lowered by adjusting the location of the plug 35 to the left or to the right (see arrow 29) from its FIG. 5 centralized position. For example, axial relocation of plug 35 to the left decreases the capacitance between plug 35 and the outer surface coating 34.

The outer conductive surfaces 33, 34 are soldered or otherwise conductively connected and secured to the inner bore of an opening 37 in core 11. The inner bore 41 of tube member 32 may be threaded to engage a threaded surface of plug 35 to effectuate axial adjustment of the latter. A gap 38 in the lower leg of the core 11 surrounds the gap 39 between the two conductive coatings 33, 34 to prevent shorting of same. In this embodiment, core 11 may be mounted on a low dielectric loss insulator 40 to relieve the capacitor unit 31 of mechanical strain.

Greater values of capacitance and capacitance range are obtained by connecting unit 31 as a single capacitor in series with core loop 16. This is accomplished by electrically connecting one of the capacitor surfaces such as 33 to plug 35. Maximum capacitance occurs when plug 35 is fully immersed in the opposite section surrounded by surface 34. Surfaces 33, 34 remain connected to the opposite sides of core 11 as shown in FIG. 5.

The method for making crystal measurements employing the FIG. 4 embodiment is the same as that previously described. For example, after setting capacitor 31 to a known value corresponding to the value of capacitance with which the crystal 15 will be used in an oscillator unit, the resonant frequency is ascertained from the frequency setting of generator 19 upon detecting a peak voltage at meter 23. Thereafter, the effective resistance and the positive reactance measurements for the crystal core follow the same method as described hereinbefore.

For the purpose of definition, and in particular, with respect to the claim herein, the term crystal shall mean both natural and synthetic piezoelectric crystals including quartz crystals.

It is intended that all matter contained in the above description and shown in the accompanying figures shall be interpreted as illustrative and not in any limiting sense.

What is claimed is:
1. A method for determining electrical characteristics of a crystal comprising the steps of:
 mounting a crystal under test in a gap of a substantially toroidal-shaped core for forming a single current conducting loop,
 coupling input and output transformer windings to said loop at respective sides of said mounting gap, wherein said loop serves as a single turn secondary winding with respect to said input winding, and serves as a single turn primary winding with respect to said output winding,
 energizing said loop by applying a signal source having a frequency of crystal resonance to said input winding, which resonant frequency is ascertainable by detecting a peak crystal current,
 bridging said output winding with a termination of known value of impedance,
 measuring a voltage across said output winding, which voltage is indicative of crystal current,
 measuring the voltage across said input winding, the effective resistance of said crystal being a function of the ratio of the last-mentioned measured voltage divided by said crystal current,
 energizing said loop by applying to said input winding first and second signals having respective frequencies greater than and less than said resonant frequency, said first and second signals being characterized by corresponding voltages at said output winding which are in the order of 3 db lower than the measured value of the output voltage corresponding to resonant frequency, and
 ascertaining the effective inductance of said crystal from the ratio of crystal effective resistance divided by $2\pi$ times the frequency span between said first and second frequencies.

References Cited

UNITED STATES PATENTS

| | | | |
|---|---|---|---|
| 1,960,168 | 5/1934 | Schoenberg | 324—60 XR |
| 1,976,904 | 10/1934 | Terman | 324—62 XR |
| 2,204,762 | 6/1940 | Mason | 324—56 XR |
| 2,358,462 | 9/1944 | Mahren | 324—58 |
| 2,362,372 | 11/1944 | Halfmann | 324—127 XR |
| 2,786,181 | 3/1957 | Hamilton | 324—61 |
| 2,976,604 | 3/1961 | Kosowsky | 324—56 XR |
| 3,234,461 | 2/1966 | Trent et al. | 324—62 |
| 3,315,156 | 4/1967 | Keller | 324—60 |

GERARD R. STRECKER, Primary Examiner

U.S. Cl. X.R.

324—59